United States Patent

Gabelli et al.

[11] Patent Number: 6,149,311
[45] Date of Patent: *Nov. 21, 2000

[54] ROLLING ELEMENT BEARING HAVING AT LEAST ONE ROLLING ELEMENT WHICH IS HARDER THAN THE OTHER ROLLING ELEMENTS AND HARDER THAN THE RACES

[75] Inventors: Antonio Gabelli, Ijsselstein; Piter Abraham Veenhuizen, Goirle; Gerardus De Vries, Nieuwegein, all of Netherlands

[73] Assignee: SKF Industrial Trading & Development Company, B.V., Nieuwegen, Netherlands

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/974,807

[22] Filed: Nov. 20, 1997

Related U.S. Application Data

[63] Continuation of application No. 08/556,061, Nov. 9, 1995, abandoned.

[30] Foreign Application Priority Data

Nov. 9, 1994 [NL] Netherlands ............................ 9401873

[51] Int. Cl.[7] .................................................. F16C 33/32
[52] U.S. Cl. ......................... 384/491; 384/492; 384/907.1
[58] Field of Search .................................... 384/491, 492, 384/907.1

[56] References Cited

U.S. PATENT DOCUMENTS

| | | | |
|---|---|---|---|
| 3,097,897 | 7/1963 | Taylor | 384/492 |
| 3,425,759 | 2/1969 | Schwarzschild | 384/491 |
| 3,574,425 | 4/1971 | Johnson et al. | 384/491 |
| 3,764,188 | 10/1973 | Suska | 384/463 |
| 4,634,300 | 1/1987 | Takebayashi et al. | 384/492 X |
| 4,872,771 | 10/1989 | Ueno et al. | 384/492 |
| 4,966,552 | 10/1990 | Gonser | 384/492 X |
| 5,114,886 | 5/1992 | Tsukada | 384/907.1 X |
| 5,456,008 | 10/1995 | Hugon | 384/491 X |

FOREIGN PATENT DOCUMENTS

| | | |
|---|---|---|
| 0238725 | 9/1987 | European Pat. Off. . |
| 0 304 872 | 3/1989 | European Pat. Off. . |
| 2479369 | 10/1981 | France . |
| 2511120 | 9/1976 | Germany . |
| 2 074 255 | 10/1981 | United Kingdom . |

*Primary Examiner*—Daniel P. Stodola
*Assistant Examiner*—Gregory J. Strimbu
*Attorney, Agent, or Firm*—Pitney, Hardin, Kipp & Szuch LLP

[57] ABSTRACT

A rolling element bearing having inner and outer rings and a plurality of rolling elements where one, two or at least one but not all of the rolling elements of the plurality of rolling elements is harder than the other of the plurality of rolling elements and harder than the rings.

12 Claims, 2 Drawing Sheets

ROLLING ELEMENT BEARING HAVING AT LEAST ONE ROLLING ELEMENT WHICH IS HARDER THAN THE OTHER ROLLING ELEMENTS AND HARDER THAN THE RACES

This is a Continuation of application Ser. No. 08/556,061 filed on Nov. 9, 1995, now abandoned.

BACKGROUND OF THE INVENTION/FIELD OF INVENTION/RELATED PRIOR ART

The invention is related to a rolling element bearing, comprising an outer ring and an inner ring which enclose a bearing space containing rolling elements, which rings consist of steel. Normally, the rolling elements of such bearing are of steel as well, in particular of steel with about the same hardness properties as the steel of the rings.

During rotation of the bearing, the rolling elements roll over the races of the rings. Any contaminations, for instance small wear particles, which are on the races or the rolling elements become compressed between these elements. Hard wear particles, for instance small steel particles which have come off of one of the components of the bearing or have entered from the outside, resist such compression and lead to the formation of minute indentations in both the races and the rolling elements.

It has been found that in particular the indentations in the races have a negative influence on the useful bearing life. Also, they lead to increased noise during running due to unsmooth running and increased play, caused by wear of the raceway surfaces.

These indentations take a craterlike shape, whereby a small central hole is surrounded by a ridge of material that has been pushed upwardly and projects above the raceway. Conversely, the rolling elements are indented as well. Due to the cyclic character of the load exerted by the rolling elements, crack formation and fatigue may occur in the rings at the location of high stress concentration usually located just under the ridge of a dent.

Although it has already been proposed to protect the bearings against such detrimental contamination particles by providing seals and filters, nevertheless the ingress thereof cannot always be totally prevented and therefore the formation of indentations cannot be excluded.

SUMMARY OF THE INVENTION

The object of the invention is therefore to alleviate the consequences of the occurrence of such indentations. This object is achieved in that at least one of the rolling elements consists of a material which is harder than the material of the other rolling elements.

Any indentations, in particular the projecting parts thereof, which are formed by solid contamination particles upon compression between the race in question and an rolling element of about the same hardness, are now compressed as soon as a rolling element with a substantially higher hardness overrolls them. Thereby, said smooth character of the raceways is restored. Only small holes are left, which do not have a reduced or negative influence on the running properties of the bearing. In these small holes minute quantities of lubricating oil are collected, which help the lubrication of the rolling element in case of oil starvation. Also, the stress concentration and thus the risk of crack formation and wear is basically reduced. Furthermore, the bearing will run more quietly.

Although any material with adequate hardness properties (Vickers hardness at 5 kg load higher than 13 GPa and modulus of elasticity (Young's modulus) higher than 280 GPa) could be applied, preferably at least one of the rolling elements consists of a ceramic material i.e. engineering ceramic materials: silicon nitride including sialons, silicon carbide and aluminium oxide, or cermets such as cemented carbides. Normally, the other rolling elements consist of steel with about the same mechanical properties as the steel used in the rings.

Rolling element bearings wherein all rolling elements consist of ceramic material are already known. Having regard to the fact that in these bearings all rolling elements exert the same compressing action on the races, the development of such indentations with high ridges is prevented.

However, due to the higher hardness and stiffness properties of these rolling elements, the stresses induced in the rings are also higher thus leading to a reduced life or capacity for such types of bearings.

In the other bearings, most of the rolling elements are made of steel; thus the deformation is shared equally between the contacting bodies leading to lower stress and preservation of the dynamic capacity of the bearing.

Most preferably, the ceramic material is silicon-nitride.

In order to avoid unbalances in the rotating bearing, at least two rolling elements consisting of a harder material are provided which are regularly spaced in the circumferential direction.

The invention will further be explained with reference to an embodiment shown in the figures.

DESCRIPTION OF THE PREFERRED EMBODIMENTS

Figure 1:
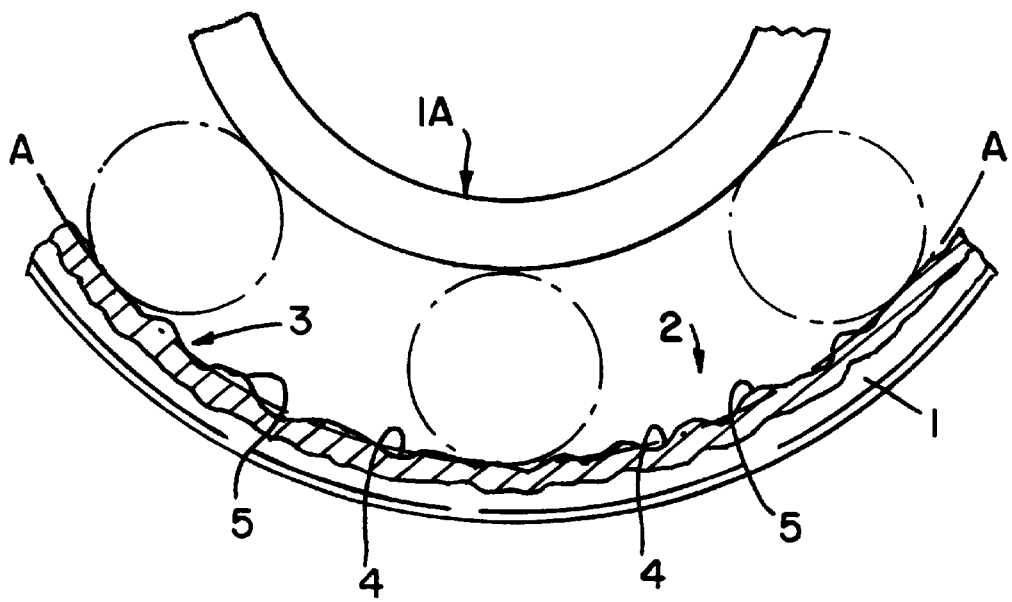
FIG. 1 and 2 shows a fragmentary side view of outer ring, having indentations, of a bearing with normal rolling elements also designated herein for convenience of terminology as a plurality of rolling elements.

The outer ring 1 of a rolling element bearing and the inner ring 1A, the other parts of which have not been shown, each has a raceway 2 over which the rolling elements may roll. Any solid contamination particles which get caught on the surface of the rolling elements and the raceway 2, will lead to the crater-like indentations 3, comprising a small indentation 4 surrounded by a ridge or projecting part 5. The dash-dot line A—A represents a circular surface of an undamaged race; indentations 4 are shown indented below said surface and projecting parts 5 adjacent indentations 4 are shown projecting upward above said surface.

In turn, these projecting parts 5 will lead to stress concentration and to indentations in the rolling elements themselves.

The presence of such indentations in both the rings and the rolling elements of the bearing lead to early fatigue and crack formation. Also higher vibrations and a noisy running of the bearing are obtained.

According to the invention, at least one of the rolling elements is of substantially harder or stiffer nature, e.g. is made of a ceramic or cemented carbides. Such rolling element, when overrolling the indentations 3, will compress at least the projecting parts 5 thereof, as shown in FIG. 2.

Figure 2:
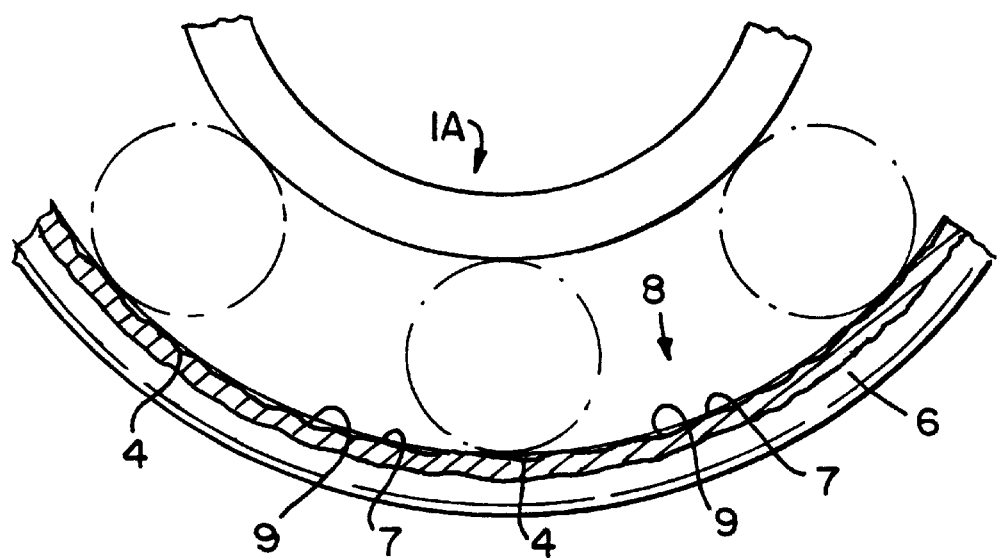
Figure 3:
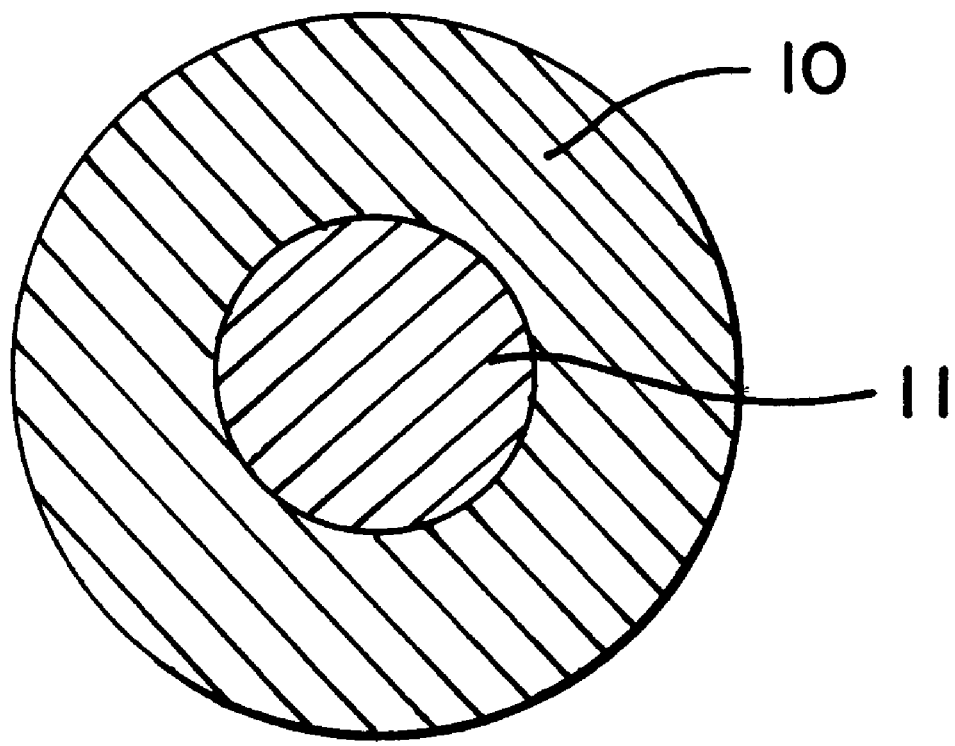
FIG. 3 shows a fragmentary view of the outer ring, having small holes, in a bearing comprising at least one stiffer or harder rolling element.

In this FIG. 2, an outer ring 6 is shown, of which the projecting parts have been compressed down, giving rise to lands 7 which correspond to the normal, surface 8 of the ring 6. The holes which are formed by the indentations are left over.

The risk of fatigue and therefore crack formation and wear in the ring of a bearing having at least 1 stiffer or harder rolling element is considerably lower than in normal bearings. The presence of the small holes 4 leads to a better lubricating of the raceway 8 and the rolling elements. In the holes 4 minute amounts of oil 9 are collected, which give better lubricating characteristics.

We claim:

1. A rolling element bearing including outer and inner rings which consist essentially of steel and which define outer and inner raceways, respectively, which enclose a bearing space, and a plurality of rolling elements within said bearing space, said plurality of rolling elements comprising a first set of said rolling elements each having an outer surface comprising steel and a second set of said rolling elements wherein at least one of second set of said rolling elements has an outer surface which is harder than said outer surfaces of said rolling elements of said first set of said rolling elements, and which is harder than said raceways of said outer and inner rings.

2. A rolling element bearing according to claim 1 wherein a Vickers hardness measured at a 5 kg load on said at least one rolling element of said second set of said rolling elements is higher than 13 GPa.

3. A rolling element bearing according to claim 1, wherein the modulus of elasticity of said at least one rolling element of said second set of said rolling elements is higher than 280 GPa.

4. A rolling element bearing according to claim 1, wherein said at least one rolling element of said second set of said rolling elements consists essentially of an engineering ceramic material and said rolling elements of said first set of said rolling elements consist essentially of steel.

5. A rolling element bearing according to claim 4, wherein said engineering ceramic material is selected from the group consisting of silicon nitride, sialons, silicon carbide, aluminum oxide and cemented carbides.

6. A rolling element bearing according to claim 1 wherein said second set of said rolling elements consists of a single rolling element.

7. A rolling element bearing according to claim 6 wherein the modulus of elasticity of said single rolling element of said second set of said rolling elements is higher than 280 GPa.

8. A rolling element bearing according to claim 6 wherein a Vickers hardness measured at a 5 kg load on said single rolling element of said second set of said rolling elements is higher than 13 GPa.

9. A rolling element bearing according to claim 6 wherein said single rolling element of said second set of said rolling elements consists essentially of an engineering ceramic material, and said rolling elements of said first set of said rolling elements consist essentially of steel.

10. A rolling element bearing according to claim 9 wherein said engineering ceramic material is selected from the group consisting of silicon nitride, sialons, silacon carbide, aluminum oxide and cemented carbides.

11. A rolling element bearing including outer and inner rings which consist essentially of steel and which define outer and inner raceways, respectively, which enclose a bearing space, and a plurality of rolling elements within said bearing space, said plurality of rolling elements comprising a first set of said rolling elements each comprising steel and a second set of said rolling elements wherein at least one of said second set of said rolling elements consists of material which is harder than said rolling elements of said first set of said rolling elements, and which is harder than said raceways of said outer and inner rings.

12. A rolling element bearing according to claim 11 wherein said second set of said rolling elements consists of a single rolling element.

* * * * *